US012331763B2

(12) United States Patent
Verho et al.

(10) Patent No.: US 12,331,763 B2
(45) Date of Patent: Jun. 17, 2025

(54) HYDRAULIC SYSTEM, WORKING VEHICLE AND METHOD

(71) Applicant: SANDVIK MINING AND CONSTRUCTION OY, Tampere (FI)

(72) Inventors: Samuli Verho, Tampere (FI); Harri Vatanen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 18/717,465

(22) PCT Filed: Dec. 9, 2022

(86) PCT No.: PCT/EP2022/085194
§ 371 (c)(1),
(2) Date: Jun. 7, 2024

(87) PCT Pub. No.: WO2023/105048
PCT Pub. Date: Jun. 15, 2023

(65) Prior Publication Data

US 2025/0043808 A1 Feb. 6, 2025

(30) Foreign Application Priority Data

Dec. 10, 2021 (EP) .................................... 21213736

(51) Int. Cl.
*F15B 11/16* (2006.01)
*E21B 7/02* (2006.01)

(52) U.S. Cl.
CPC ............ *F15B 11/165* (2013.01); *E21B 7/022* (2013.01); *E21B 7/025* (2013.01); *F15B 2211/20515* (2013.01); *F15B 2211/20538* (2013.01); *F15B 2211/255* (2013.01); *F15B 2211/26* (2013.01); *F15B 2211/45* (2013.01)

(58) Field of Classification Search
CPC ................ F15B 11/0423; F15B 11/055; F15B 11/165; F15B 2211/20515; F15B 2211/20538; F15B 2211/255; F15B 2211/26; F15B 2211/45
See application file for complete search history.

(56) References Cited

U.S. PATENT DOCUMENTS 3,948,146 A * 4/1976 Maurer .................. F15B 11/02
91/464
4,920,748 A * 5/1990 Kordak ................ F16H 61/423
60/449

(Continued)

FOREIGN PATENT DOCUMENTS

| | | | |
|---|---|---|---|
| EP | 0300080 | A1 | 1/1989 |
| WO | 2011148051 | A1 | 12/2011 |

*Primary Examiner* — Michael Leslie
(74) *Attorney, Agent, or Firm* — Corinne R. Gorski

(57) ABSTRACT

A hydraulic system, working vehicle, and method for producing hydraulic power to a hydraulic system of a working vehicle is provided. The hydraulic system includes a fixed displacement hydraulic pump and a speed and torque controlled electric motor for driving the hydraulic pump. An electric controller is arranged to adjust the speed of the electric motor and to thereby adjust produced hydraulic fluid flow and pressure in the system. Further, there is a bypass flow channel including a throttle element for directing limited continuous discharge fluid flow from the system.

9 Claims, 3 Drawing Sheets

(56) References Cited

U.S. PATENT DOCUMENTS

| | | | | |
|---|---|---|---|---|
| 8,869,923 | B2 * | 10/2014 | Osara | B60L 7/06 180/65.1 |
| 9,102,415 | B2 * | 8/2015 | Bartov | F15B 11/08 |
| 9,457,986 | B2 * | 10/2016 | Bisig | F15B 11/044 |
| 12,188,493 | B2 * | 1/2025 | Darnell | F15B 11/0423 |
| 12,234,727 | B2 * | 2/2025 | Verho | E21B 7/022 |
| 2008/0288115 | A1 | 11/2008 | Rusnak et al. | |
| 2012/0090308 | A1 | 4/2012 | Yuan et al. | |
| 2024/0263652 | A1 * | 8/2024 | Torii | F04B 53/08 |

* cited by examiner

HYDRAULIC SYSTEM, WORKING VEHICLE AND METHOD

RELATED APPLICATION DATA

This application is a § 371 National Stage Application of PCT International Application No. PCT/EP2022/085194 filed Dec. 9, 2022 with priority to EP 21213736.8 filed Dec. 10, 2021.

BACKGROUND OF THE INVENTION

The invention relates to a hydraulic system of a working vehicle. The hydraulic system is provided with a fixed displacement pump, and a speed and torque controlled electric motor for producing hydraulic power. The electric motor is controlled by means of an electric controller.

The invention further relates to a working vehicle and to a method of producing hydraulic power to a hydraulic system of a working vehicle.

The field of the invention is defined more specifically in the preambles of the independent claims.

At different work sites different working vehicles are used for executing work tasks. The working vehicles may comprise hydraulic actuators connected to hydraulic systems of the vehicles. In a modern hydraulic system, there may be a fixed displacement hydraulic pump driven by a speed and torque controlled electric motor for generating the needed hydraulic power. These types of systems have several advantages. However, the known solutions have shown to have some disadvantages especially in special situations when there is a need for pressure with no requirement for fluid flow.

BRIEF DESCRIPTION OF THE INVENTION

An object of the invention is to provide a novel and improved hydraulic system, a working vehicle equipped with such hydraulic system and a method for producing hydraulic power to a hydraulic system of a working vehicle.

The hydraulic system according to the invention is characterized by the characterizing features of the first independent apparatus claim.

The working vehicle according to the invention is characterized by the characterizing features of the second independent apparatus claim.

The method according to the invention is characterized by the characterizing features of the independent method claim.

An idea of the disclosed solution is that a hydraulic system of a working vehicle comprises one or more fixed displacement hydraulic pumps which are powered by one or more speed and torque controlled electric motors. The motors are controlled by means of one or more electric controllers for adjusting the speed of the electric motor and to thereby adjusting produced hydraulic fluid flow and pressure in the hydraulic system. Further, the hydraulic system is provided with one or more by-pass flow channels comprising one or more throttle elements for directing limited continuous discharge fluid flow from the hydraulic system.

In other words, the hydraulic system is provided with the throttle element arranged parallel to the hydraulic pump whereby there is a small hydraulic leak flow out of the hydraulic system to a hydraulic reservoir or tank. Purpose of the throttle element is to keep magnitude of the flow in the by-pass flow channel low so that energy consumption is not increased due to the by-pass flow.

An advantage of the disclosed solution is that the pump-motor arrangement, or hydraulic power unit, is driven continuously because of the by-pass flow and thereby the pressure output of the hydraulic pump can be stable. Thus, fluctuations in hydraulic output can be avoided and control of the hydraulic system can be smooth and improved.

In general, advantages of the disclosed arrangement comprising the fixed displacement pump and speed and torque controlled electric motor are that hydraulic system pressure can be controlled fast and accurately by means of the electrical controller. The system can keep the system pressure accurately on controlled values and can adapt quick and automatically to different flow demands of the system by speed adaption of the motor and pump. The flow supplied to the system is always in accordance with need. Then the system can be energy efficient and provides accurate pressure control. However, an internal structure of the fixed displacement pump has small leakages and when the pump is driven in a special situation against a "blocked system" (pressure>0 bar and flow=0), then the small internal leakages may cause the pump to rotate periodically a bit for compensating the leakage. The internal leakage is so small that the hydraulic pump is not rotated continuously which causes unsmooth drive and pressure fluctuations in the system pressure. The disclosed by-pass flow channel and the continuous by-pass flow through it will provide the system with smooth drive.

According to an embodiment, the magnitude of the by-pass flow is dimensioned so that rotation of the hydraulic pump is always at least 30-200 rpm. In other words, the magnitude of the by-pass flow is dimensioned to be small by means of the throttle element, whereby no relevant power and energy consumption occurs due to the caused constant rotation of the pump-motor arrangement. In the solution low speed rotation of the motor and pump is implemented in situations when no fluid flow is needed in the system, but pressure request is on for the electric controller. The magnitude of the rotation speed may be dependent on power output grade of the hydraulic pump, for example.

According to an embodiment, the disclosed by-pass arrangement is adapted to generate slow speed rotation of the pump 150 rpm when no fluid flow request occurs in the electric controller. Then electric consumption of idle run of the motor may be low, for example 250-300 W.

According to an embodiment, the throttle element is an adjustable element whereby magnitude of the by-pass flow is adjustable. An advantage of the disclosed embodiment is that the by-pass flow and the followed continuous rotation of the pump can be adjusted case by case to adapt different use cases and operational situations.

According to an embodiment, the throttle element may be a valve or orifice comprising an adjustable through opening for the fluid flow passing through it.

According to an embodiment, the throttle element is a pressure compensated element whereby magnitude of the bypass flow is configured to be adjusted automatically in response to magnitude of pressure prevailing in the hydraulic system. In other words, the by-pass flow system can adapt to different output pressure situations and can thereby keep the output of the pump stable in different operational situations. An advantage of this solution is that the pressure compensated throttle element can take care of that the by-pass flow stays low also at high pressures and thereby ensures good energy efficiency.

According to an embodiment, the electric controller is a variable frequency drive serving as an electrical motor control device for controlling torque and rotation speed of the electric motor. In other words, the disclosed solution aims to stabilize pressure of an inverter controlled hydraulic system.

According to an embodiment, the electric controller is configured to control the torque and speed of the motor to adapt the speed of the hydraulic pump in accordance with needed fluid flow at requested pressure level.

According to an embodiment, the disclosed solution relates to a working vehicle. The working vehicle comprises: a movable carrier; one or more work devices mounted on the carrier; and at least one hydraulic system. The hydraulic system is in accordance with the features and embodiments disclosed in this document.

According to an embodiment, the working vehicle is a mining vehicle comprising at least one hydraulically operable mining actuator connected to the hydraulic system.

According to an embodiment, the above mentioned mining vehicle is a rock drilling rig, a loading vehicle, or a hauling vehicle.

According to an embodiment, the working vehicle is alternatively a forest machine, earth moving machine, or mobile crane.

According to an embodiment, the carrier of the working vehicle is provided with a brake system comprising spring loaded brakes openable with hydraulic brake actuators. Thus, the brakes are of normally on type. The disclosed solution is implemented for powering the hydraulic brake actuator keeping the brakes off during transfer drives. Then high pressure is needed for the brake actuators without a need for fluid flow since normal working actuators are not operable during the transfer drives.

According to an embodiment, the disclosed solution relates to a method of producing hydraulic power to a hydraulic system of a working vehicle. The method comprises: rotating a fixed displacement hydraulic pump by means of a speed and torque controlled electric motor; and controlling the rotation of the motor by means of an electric controller for adjusting the speed of the hydraulic pump and to thereby adjusting the produced hydraulic fluid flow and pressure in the hydraulic system. The method further comprises directing limited continuous discharge fluid flow via a by-pass flow channel and through a throttle element from an output side of the hydraulic pump to a reservoir whereby the hydraulic pump is driven continuously, and output of the hydraulic pump is stabilized.

According to an embodiment, the method comprises stabilizing pressure fluctuations in operational situations when pressure is needed for the output of the hydraulic pump and fluid flow is not.

According to an embodiment, the method comprises restricting magnitude of the by-pass flow by means of the throttle element for limiting hydraulic energy consumption.

According to an embodiment, the method comprises adjusting magnitude of the by-pass flow by means of the throttle element to correspond low speed rotation of the hydraulic pump at 30-200 rpm in situation where one or more hydraulic actuators connected to the hydraulic system require no fluid flow but require pressure.

The above disclosed embodiments may be combined in order to form suitable solutions having those of the above features that are needed.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION OF SOME EMBODIMENTS

Figure 1:
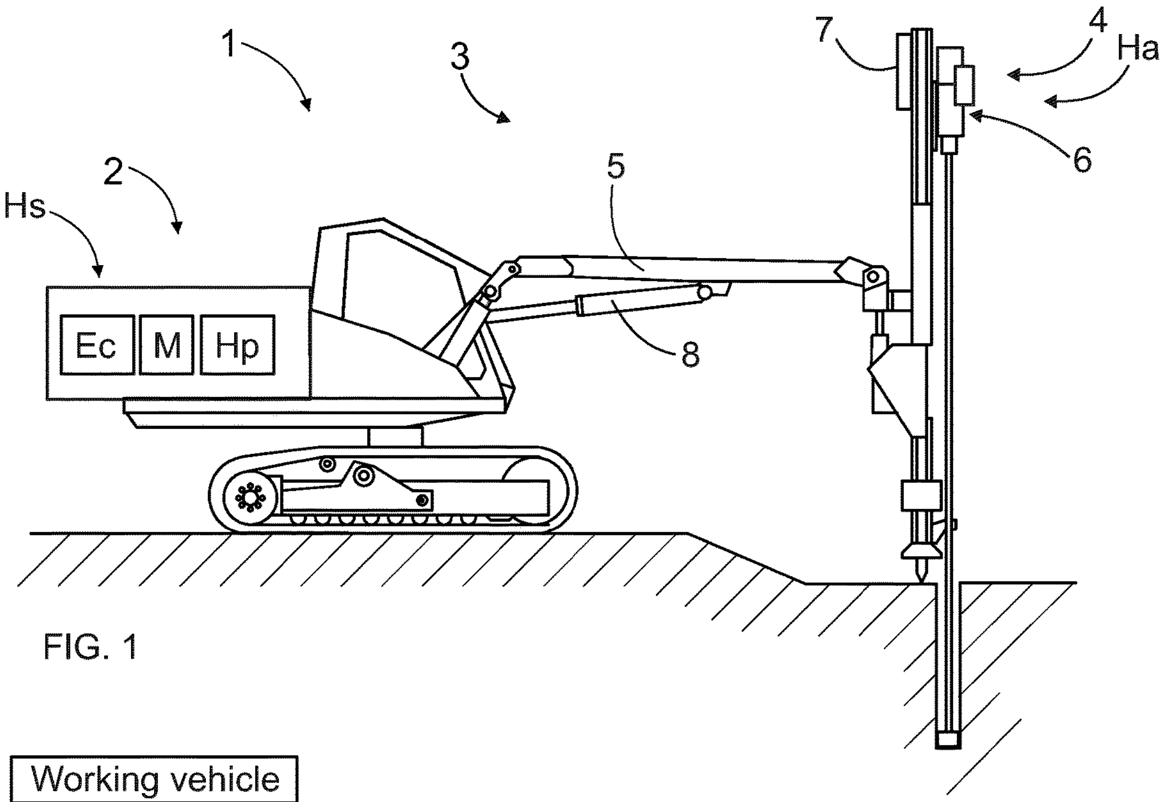
FIG. 1 is a schematic side view of working vehicle provided with a hydraulic system.

FIG. 1 discloses a working vehicle 1 which comprises a movable carrier 2 and one or more work devices 3. In this case the working vehicle 1 is a rock drilling rig for drilling drill holes to a rock surface. The rock drilling rig comprises one or more rock drilling units 4 arranged on one or more drilling booms 5. The drilling unit 4 comprises a rock drilling machine 6 which serves as a hydraulic actuator Ha connected to a hydraulic system Hs. There may be also other hydraulic actuators such as a feed device 7 and boom cylinders 8. Other hydraulic actuators on the carrier are also possible, such as breaking actuators. The hydraulic system Hs comprises a hydraulic pump Hp, an electric motor M and an electric controller Ec for controlling the motor M.

Figure 2:
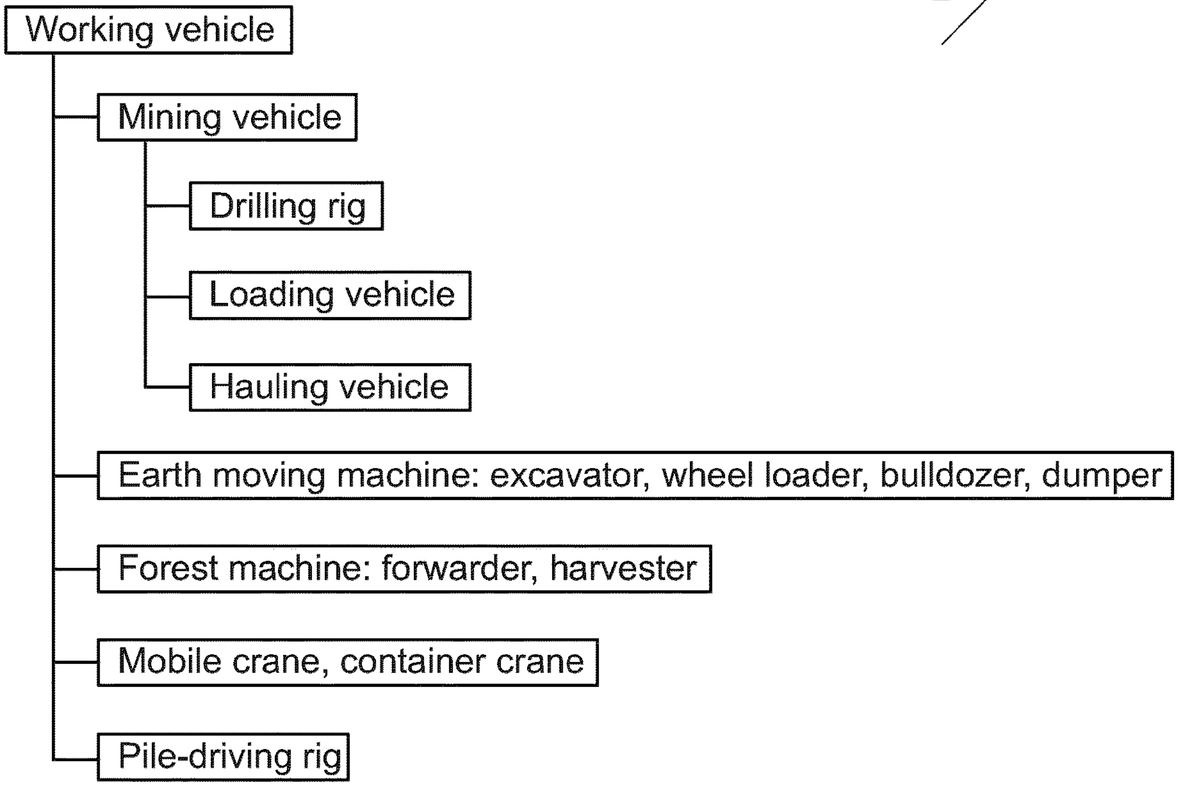
FIG. 2 is a schematic diagram showing some possible working vehicles wherein the disclosed solution can be implemented.

FIG. 1 is only an example of the working vehicle 1. FIG. 2 discloses a listing of some possible working vehicles wherein the hydraulic system according to this document can be implemented. As it is disclosed in FIG. 2, the working vehicle may be a loading vehicle, or a haling vehicle used for transporting removed broken rock material in mines. Further, the working machine may be an earthmoving machine or vehicle, such as an excavator, a wheel loader, a bulldozer, or a dumper. The disclosed solution can be utilized also in forest machines, such as in harvesters and forwarders. Different mobile cranes and container handling apparatuses may be provided with the disclosed hydraulic system. One more working apparatus to be mentioned, as an example of the working machine, is a pile-driving machine. All the mentioned working vehicles may have operational situations wherein the hydraulic system is subjected to requests for high fluid pressure with no fluid flow.

Figure 3:
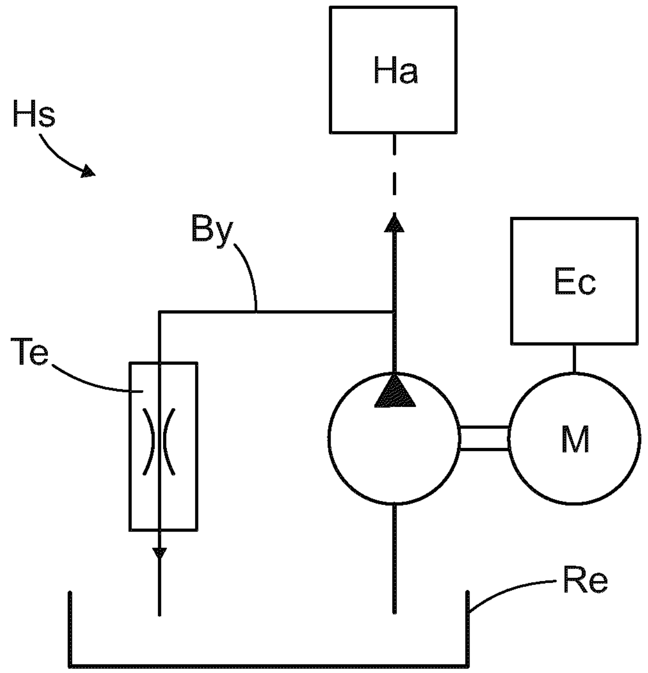
FIG. 3 is a schematic view of a hydraulic diagram of the disclosed hydraulic system.

FIG. 3 discloses a hydraulic system Hs comprising a fixed displacement hydraulic pump Hp rotatable with a speed and torque controlled electric motor M. The electric motor M is controlled by means of an electric controller Ec. The pump-motor combination generates hydraulic power for powering one or more hydraulic actuators Ha. For simplicity reasons only one hydraulic actuator Ha is presented. Further, there is a by-pass flow channel By comprising at least one throttle element Te for directing limited continuous discharge fluid flow to a reservoir Re.

Figure 4:
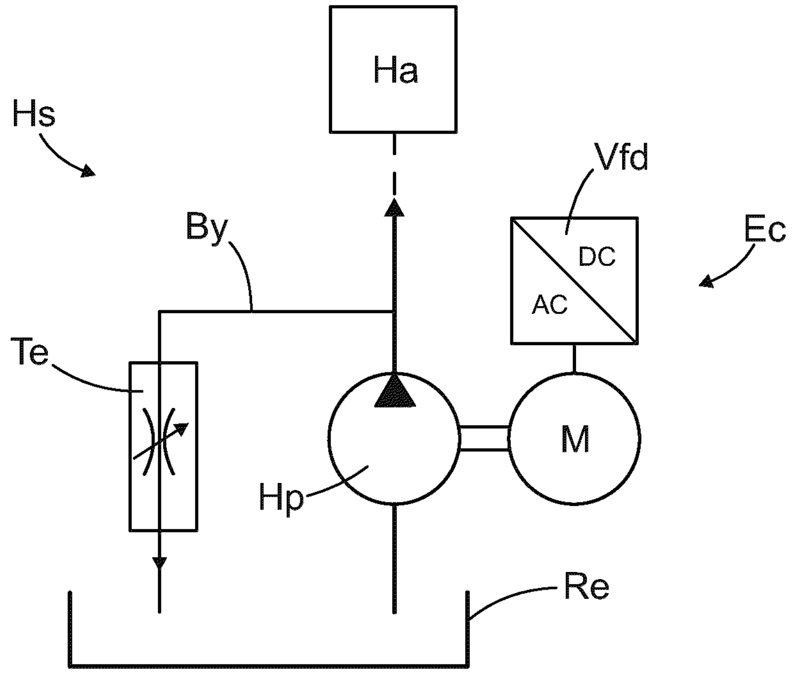
FIG. 4 is a schematic view of an alternative hydraulic diagram of the disclosed hydraulic system.

FIG. 4 differs from the solution of FIG. 3 only in that the throttling element Te is adjustable and that the electric controller Ec is a variable frequency drive Vdf.

Figure 5:
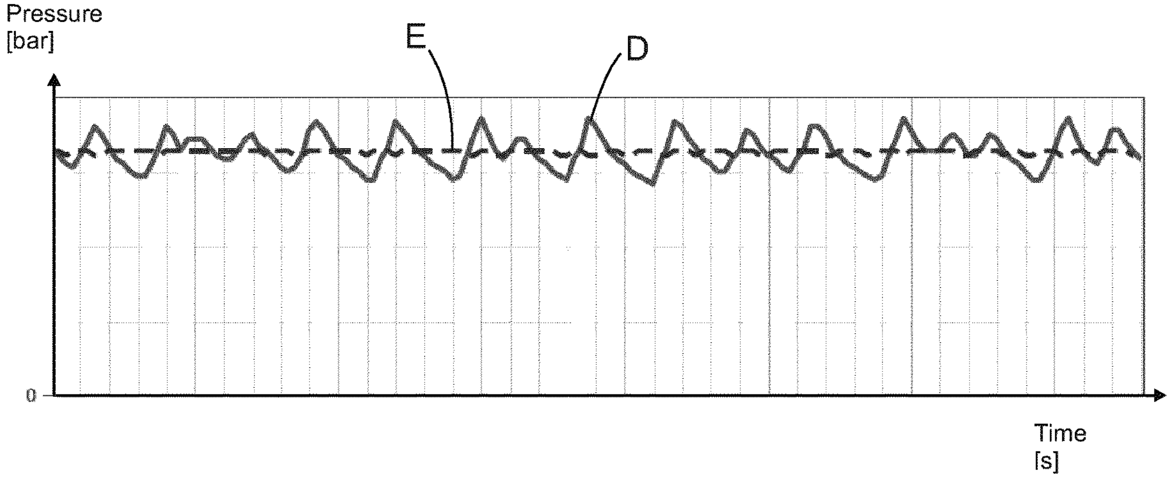
FIG. 5 is a schematic view of two graphs for illustrating sensed pressures as a function of time.
Figure 6:
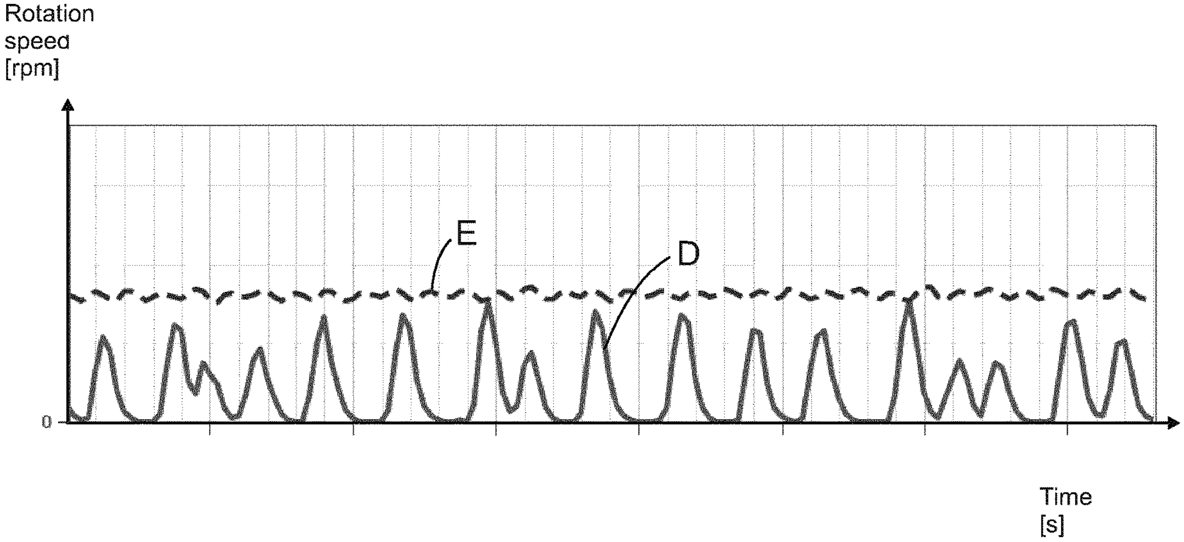
FIG. 6 is a schematic view of two graphs for illustrating sensed rotation speeds of a hydraulic pump as a function of time.

FIGS. 5 and 6 show first curves E of a hydraulic system with the disclosed solution, and second curves D of a substantially similar kind of hydraulic system without the by-pass flow system. As can be seen in FIG. 5, there occurs significant pressure fluctuation in the second curve D whereas in the hydraulic system implementing the present solution, the first curve E is stabilized. The stabilizing effect of the disclosed solution can also be seen when comparing curves E and D in FIG. 6 showing the rotation speed of the hydraulic pump. Stabile and controlled rotation of the hydraulic pump is clearly shown by the curve E. In both FIGS. 5 and 6 the curves E are flat or almost flat.

The drawings and the related description are only intended to illustrate the idea of the invention. In its details, the invention may vary within the scope of the claims.

The invention claimed is:

1. A hydraulic system of a working vehicle comprising:
- at least one fixed displacement hydraulic pump;
- at least one speed and torque controlled electric motor arranged for driving the hydraulic pump;
- at least one hydraulic actuator;
- at least one electric controller arranged for adjusting a speed of the electric motor thereby adjusting produced hydraulic fluid flow and pressure in the hydraulic system; and
- at least one by-pass flow channel including at least one throttle element arranged for directing limited continuous discharge fluid flow from the hydraulic system, wherein the throttle element is a pressure compensated element whereby magnitude of the by-pass flow is configured to be adjusted automatically in response to a magnitude of pressure prevailing in the hydraulic system.

2. The hydraulic system as claimed in claim 1, wherein the magnitude of the by-pass flow is dimensioned so that rotation of the hydraulic pump is always at least 30-200 rpm.

3. The hydraulic system as claimed in claim 1, wherein the electric controller is a variable frequency drive serving as an electrical motor control device for controlling torque and rotation speed of the electric motor.

4. The hydraulic system as claimed in claim 1, wherein the electric controller is configured to control the torque and speed of the motor to adapt the speed of the hydraulic pump in accordance with needed fluid flow at requested pressure level.

5. A working vehicle, comprising:
- a movable carrier;
- at least one work device mounted on the carrier; and
- at least one hydraulic system; characterized in that the hydraulic system is in accordance with claim 1.

6. The working vehicle as claimed in claim 5, wherein the working vehicle is a mining vehicle including at least one hydraulically operable mining actuator connected to the hydraulic system.

7. A method of producing hydraulic power to a hydraulic system of a working vehicle, the method comprising:
- rotating a fixed displacement hydraulic pump by means of a speed and torque controlled electric motor;
- controlling rotation of the motor by means of an electric controller arranged for adjusting a speed of the hydraulic pump and thereby adjusting a produced hydraulic fluid flow and pressure in the hydraulic system;
- directing a limited continuous discharge fluid flow via a by-pass flow channel and through a throttle element from an output side of the hydraulic pump to a reservoir, whereby the hydraulic pump is driven continuously, and an output of the hydraulic pump is stabilized; and
- restricting a magnitude of the by-pass flow by means of the throttle element for limiting hydraulic energy consumption, wherein the magnitude of the by-pass flow is configured to be adjusted automatically in response to a magnitude of pressure prevailing in the hydraulic system.

8. The method as claimed in claim 7, further comprising stabilizing pressure fluctuations in operational situations when pressure is needed for the output of the hydraulic pump and fluid flow is not.

9. The method as claimed in claim 7, further comprising adjusting the magnitude of the by-pass flow by means of the throttle element to correspond to a low speed rotation of the hydraulic pump at 30-200 rpm in situation, where one or more hydraulic actuators connected to the hydraulic system require no fluid flow but require pressure.

* * * * *